United States Patent [19]  [11] 4,042,718
Rawlings et al.  [45] Aug. 16, 1977

[54] METHOD FOR MANUFACTURING RUMINANT FEED-SUPPLEMENTS COMPRISING A PROTEIN-ALDEHYDE COMPLEX

[75] Inventors: Robert M. Rawlings; Donald Procter, both of Boise, Idaho

[73] Assignee: Commonwealth Scientific and Industrial Research Organization, Australia

[21] Appl. No.: 642,998

[22] Filed: Dec. 22, 1975

[51] Int. Cl.² .............................................. A23K 1/18
[52] U.S. Cl. ...................................... 426/573; 426/93; 426/98; 426/601; 426/609; 426/656; 426/807
[58] Field of Search ....................... 426/807, 2, 93, 98, 426/573, 576, 601, 609, 656; 252/316

[56] References Cited

U.S. PATENT DOCUMENTS

| | | | |
|---|---|---|---|
| 3,043,782 | 7/1962 | Jensen | 252/316 |
| 3,265,630 | 8/1966 | Jensen | 252/316 |
| 3,925,560 | 12/1975 | Scott et al. | 426/93 X |

*Primary Examiner*—Joseph M. Golian
*Attorney, Agent, or Firm*—Richards, Harris & Medlock

[57] ABSTRACT

An improved method for manufacturing a feed supplement for ruminants in which lipids are encapsulated in a protective protein-aldehyde complex coating which includes the steps of forming an emulsified product in which particles of lipid material are surrounded by protein, treating the emulsified product with an aldehyde and allowing a gel to form, contacting the gel with an effective amount of an acid constituent to affect syneresis, and thereafter recovering the concentrated gel constituent. The gel can thereafter be dried to form a free-flowing particulate composition.

17 Claims, No Drawings

METHOD FOR MANUFACTURING RUMINANT FEED SUPPLEMENTS COMPRISING A PROTEIN-ALDEHYDE COMPLEX

BACKGROUND OF THE INVENTION

This invention relates to ruminant feed supplements having nutritional, therapeutic or prophylactic properties and to a method of producing such supplements. In one aspect the invention relates to a method for treating protein-aldehyde gels to induce syneresis and thus allow removal of water entrained within the gel prior to use of the gel or further processing of the gel.

Milk, meat and meat byproducts of ruminants, such as cows and sheep, constitute a large portion of the human diet. Such products normally contain hydrogenated fat, e.g., saturated fat, which has been medically detrimental to a humans' health. Many feed supplements have been proposed for ruminants so that the milk, meat, and meat byproducts of said ruminants would contain polyunsaturated fat rather than the saturated fat. However, in attempting to devise such a feed supplement problems have been encountered due to the complex digestive system of the ruminant animal. For instance, the ruminant animal has a multi-gastric system with a first stomach called a rumen wherein bacteria known as microflora are present. These bacteria have the ability to break down protein and hydrogenate unsaturated lipids. Thus, a significant portion of the unsaturated lipids contained in ruminant feed are hydrogenated in the rumen by the microflora and assimilated by the animal as saturated fat. Further, problems have been encountered in that the rumen apparently has a low tolerance to feeds containing high concentrations of saturated or unsaturated lipids. This low tolerance produces severe gastric process imbalance when feeds containing high concentrations of lipids are ingested. This imbalance can cause the lipid material to be regurgitated or excreted in essentially its undigested form. Feeding high concentrations of lipids, therefore, resulted in a loss of appetite and the animals becoming infirm. It has also been demonstrated that the lipids per se are assimilated more efficiently when rumen by-pass is achieved, in so far as the lipids are not partially utilized for support of the bio-system in the rumen.

Recently, a ruminant feed supplement has been developed, which, upon ingestion by a ruminant, is not susceptible to breakdown in the rumen but is susceptible to breakdown in the abomasum and lower gut. Upon assimilation of the feed supplement the polyunsaturated fat content of the milk and carcass is significantly increased. This feed supplement is made by contacting an oilseed, containing lipids naturally dispersed within a proteinaceous material, with ammonia in order to activate the proteinaceous material. Thereafter, the ammoniated proteinaceous material is reacted with an aldehyde to form an ammoniated protein-aldehyde complex. The resulting feed supplement and process for producing same are set forth in U.S. Pat. No. 3,875,310, entitled "Ruminant Feed Supplement Comprising An Ammoniated Protein-Aldehyde Complex".

In addition, a process has been developed to encapsulate lipids in a protective protein-aldehyde complex coating. The protein-aldehyde complex feed supplement is not susceptible to breakdown in the rumen but is susceptible to breakdown in the abomasum and lower gut. Basically, the process for producing the protein-aldehyde complex feed supplement consists of finely dividing a lipid material into discreet particles or globules and forming an aqueous emulsion containing the finely divided lipid material and a proteinaceous material. The aqueous emulsion can then be reacted with an aldehyde so that the lipid particles are encapsulated in a protein-aldehyde complex. The emulsion can be spray dried or otherwise processed prior to the aldehyde addition or thereafter to form a coated particulate solid.

The disadvantages of the above process are cost and preparation time. For instance, when a solid feed is desired the emulsion must be dried. Large amounts of energy are required to dehydrate and dry the emulsion, such cost reflecting in the overall cost of the product. Therefore, new methods for preparing ruminant feed supplements are being investigated, especially processes for preparing such feed supplement employing emulsification techniques. However, the process developed must allow one to substantially reduce process cost and preparation time without affecting the desired characteristics of the feed supplement.

SUMMARY OF THE INVENTION

According to the invention, an improved method for producing feed supplements for ruminants is provided wherein lipids are encapsulated in a protein-aldehyde complex coating. Broadly, the method for producing feed supplements comprises forming an emulsion of lipid and protein material in an aqueous solution so that the lipids are encapsulated in the protein constituent; contacting the protein encapsulated lipid product with an aldehyde and allowing a gel to form, said gel containing emulsion having a pH level greater than about 7; contacting the gel with an effective amount of acid to provide pH levels for the acid treated gel containing emulsions of less than about 6.5; allowing the treated emulsions to remain at quiescent conditions at ambient temperatures for a period of time effective to allow syneresis; and, thereafter recovering the gel constituent.

DETAILED DESCRIPTION OF PREFERRED EMBODIMENTS

The emulsion, containing the gel of an encapsulated lipid having a protective protein-aldehyde coating, which can be treated according to the present invention can be prepared by the method set forth in U.S. Pat. No. 3,925,560, issued Dec. 9, 1975 and entitled "Feed Supplements For Ruminants Comprising Lipid Encapsulated With Protein-Aldehyde Reaction Product", hereinafter incorporated in part. The emulsion, which is an aqueous emulsion, is formed by admixing the lipid material and a proteinaceous material in water. The aldehyde used to encapsulate the protein-coated lipid can be introduced simultaneously with the lipid and proteinaceous material or after coating of the lipid has occurred. However, it should be noted that the lipid material should be finely subdivided by the protein since it is believed that the acceptability of the high lipid supplement is due primarily to the small globules of oil and their intimate association with digestible or semi-digestible proteins.

One suitable method of preparing the before described emulsion is by admixing an effective amount of a proteinaceous material with water at a temperature of from about 50° to about 80° C for an effective period of time to allow a resulting solution to form. It is desired that the pH level of the aqueous solution be maintained greater than about 7 to increase the solubility of the proteinaceous material. The desired pH level can readily be achieved by incorporating into the aqueous solution an effective amount of a caustic material. Any suitable caustic material can be employed provided it is not harmful to ruminants. However, from a practical standpoint, caustic materials such as the alkali metal hydroxides and alkaline-earth metal hydroxides are employed.

After the aqueous, protein containing solution has been formed the lipid, or oil component, is introduced thereto. To form the desired emulsion, the resulting mixture is placed in a colloid or stone mill for a sufficient period of time and thereafter passed through a homogenizer to effect emulsification. Emulsification can be facilitated by the presence of an emulsifying agent, such as lecithin, polyoxyethylene sorbitan, monopalmitate, and the like. Also, should it be desirable to incorporate lipid-soluble substances into the feed supplement, these may conveniently be introduced simultaneously with the lipid.

The aqueous emulsion so formed is then contacted with an effective of an aldehyde. This treatment results in the encapsulation of the protein-lipid components and the formation of a gel. The gel, containing the feed supplement has a large amount of entrained water. We have now found that gel formation can be improved and a large portion of the entrained water removed from the gel by admixing an effective amount of an acid constituent with the gel and thereafter allowing the acid treated gel to remain at ambient temperatures and under quiescent conditions for a period of time effective to allow syneresis of the gel to occur.

The amount of acid employed can vary depending upon the pH level of the emulsion. However, it is desirable that the pH level of the emulsion, and thus the gel, after the addition of the acid, be less than about 6.5. The term "Syneresis" as used herein is to be understood to mean the contraction of a gel on standing with exudation of water. By employing the acid constituent to effect syneresis, up to about 40 percent of the entrained water in the gel can be removed so that upon the use of mechanical separation techniques such as pressing, centrifuging, filtering and the like a concentrated protein-aldehyde gel can be recovered. It should be noted that the resulting gel is a granular gel which does not have a tendency to agglomerate. Thus, upon the gel being separated from the aqueous phase and dried the remaining entrained water can be efficiently and effectively removed to provide a granular material having a size for example, of about 5 microns to about 200 microns in diameter. The time required to allow syneresis to be affected can vary widely, but will generally be from about 10 to about 30 minutes. The gel can be dried by any means well known in the art such as by the use of drum type agricultural driers at temperatures from ambient to about 200° F to a moisture level less than about 14 percent by weight thereof. The preferred moisture level in the dried product is less than about 12 percent by weight thereof.

In practicing the process of the present invention a wide variety of protein materials may be used, and their choice will depend upon their cost, emulsifing properties, and digestibility characteristics. For example, animal protein such as casein, gelatin, and others obtainable from fish or meatmeals, plant proteins, such as gluten or those present in the oilseeds themselves are suitable. Any seed containing quantities of lipids and preferably unsaturated lipids and more preferably poly-unsaturated lipids generally known as oilseeds, can be used in the scope of the instant invention. For example, oilseeds such as sunflower, safflower, peanut, soybean, cotton, maize or rape and the like can be used. When such are employed they are preferably comminuted prior to use by being broken down into at least two pieces in order to expose more proteinaceous material. Preferably, such seeds are ground to a particulate size of from about 1/32 to about 5/32 inch and more preferably to about 3/32 inch. However, in selecting the proteinaceous material one should be careful to insure that it is normally available in digestible form and in a form such that it is susceptible to attack by the gastric juices of the ruminant abomasum, duodenum or intestine.

The amount of proteinaceous material to lipid material employed in the aqueous emulsion can vary widely, depending to a large extent on the amount of lipid material desired in the product while insuring that the aqueous emulsion remain in a fluid state. Generally, however, the liqid material and the proteinaceous material are incorporated into the aqueous emulsion in an amount effective to provide a weight ratio of lipid material to proteinaceous material in the range of from about 1:1 to about 6:1.

The treatment of the proteinaceous material with the aldehyde provides a feed supplement which is not sufficiently attacked by the microflora of the rumen so that digestibility of the proteinaceous material is not significantly impaired. The aldehyde utilized in forming the protein-aldehyde complex can be any hydrocarbon containing at least one aldehyde group thereon which is not detrimental to the ruminant. The amount of aldehyde employed will vary widely but will generally be between from about 0.5 to 6 weight percent, based on the amount of protein employed, preferably from about 0.5 to 3 percent by weight and more preferably 2 percent by weight. The aldehyde employed may be liquid, solid or gaseous in form. Based upon availability, a preferred group of aldehydes is formaldehyde, gluteraldehyde, glyoxal and the like. Because of its cost and availability, formaldehyde is the most preferred aldehyde.

If it is desired to administer hormones, vitamins, or other medicaments and modifying agents into the feed supplements, these should be in lipid-soluble forms and incorporated into the lipid component during the emulsification step of the present invention. However, it should be noted that the hormones, vitamins, and other modifying agents need not be unsaturated. The term "other modifying agents" is intended to include flavoring, antioxidant, texturizing, and like substances employed for their respective effect upon the meat, fat or milk products of the ruminant.

The amount of the acid constituent employed to effect syneresis of the gel produced from the emulsion can vary, as can the selection of the particular acid. As previously stated, sufficient acid must be incorporated to provide an acid treated gel containing emulsion having a pH of 6.5 or less. Preferably, sufficient acid will be employed to lower the pH of the acid treated emulsion to levels of from about 1.7 to 5. As can be well understood, the amount of acid employed will vary depending on the particular acid used as well as its strength. However, especially desirable results have been obtained wherein the acid constituent is employed in an amount of from about 1 to 4 weight percent based on the amount of gel being treated. While any suitable acid constituent can be employed which is not detrimental to the feed supplement or ruminants, preferably the acid constituent is phosphoric acid, sulfuric acid, hydrochloric acid, or acetic acid. Especially desirable results are obtained wherein the acid constituent is phosphoric acid and is employed in amount of from about 1 to 2 weight percent.

Once the acid has been added to the gel containing emulsion and syneresis has been affected, the gel can be removed from the aqueous solution by any suitable means known in the art. Once the gel has been separated, it can then be utilized as a feed supplement in the gel form or can, more preferably, be dried as previously stated to form a granular free-flowing particulate material. It should be noted that if one desires to effect the desired syneresis of the gel produced according to the method of the present invention, the acid constituent must be added to the protein-aldehyde complex containing emulsion before the supplement is dried. Further, if the acid is contacted with the emulsion prior to the formation of the protein-aldehyde complex, syneresis will not be affected. Thus, the acid must be added to the gel-containing emulsion only after formation of the complex and while same is still in an emulsion containing state. By employing the process of the invention, the reaction product between the acid constituent and the caustic constituent is contained predominately within the gelled feed product, a totally unexpected result.

The invention can be more easily understood from the study of the following examples which are given for illustrative purposes only.

EXAMPLE 1

A protein-aldehyde complex gel was produced utilizing the techniques described above. To 450 pounds of water was added 100 pounds of soymeal, 35 pounds of sunmeal, and 5.5 pounds of caustic soda flake. The caustic soda flake was employed to assist in the solubilizing of the protein materials in the water. Thereafter, tallow in the amount of 90 pounds was incorporated into the aqueous solution. Thereafter, the mixture was agitated to form the desired emulsion. 9 pounds of 37 percent solution of formaldehyde was then added to the emulsion. The addition of the formaldehyde formed a protein-aldehyde complex resulting in the gelling of the proteinaceous material and the consequent encapsulation of the discrete lipid globules which were formed at the emulsion stage. The gel had a pH of 10.6 and a moisture content of 69.1.

The gel formed as described above was used in a series of examples to determine the effect of phosphoric acid on the gel. In each experiment an 85 percent solution of phosphoric acid, feed grade, was employed. The amount of phosphoric acid used was varied. In each experiment the phosphoric acid was blended into the gel with hand stirring and the pH of the acid treated gel determined. Thereafter, the mixture was allowed to stand for 30 minutes, then placed into a muslin cloth and hand squeezed to remove free water. The sample was then weighted and the amount of water removed from the gel determined, such representing the amount of the entrained water removed by the addition of the acid. The summary of these experiments are set forth in table below:

TABLE 1

| Wt % Gel | Wt % Acid | pH of Gel after acid treatment | Wt % water removed |
|---|---|---|---|
| 99.0 | 1.0 | 4.9 | 28.22 |
| 98.5 | 1.5 | 4.6 | 35.46 |

TABLE 1-continued

| Wt % Gel | Wt % Acid | pH of Gel after acid treatment | Wt % water removed |
|---|---|---|---|
| 98.0 | 2.0 | 4.2 | 44.86 |
| 97.0 | 3.0 | 3.2 | 57.33 |

EXAMPLE II

A gel was prepared according to the procedures set forth in Example 1. The pH of the gel was determined to be 10.8 and had a moisture content of 72 percent. The resulting gel was then subjected to a series of experiments using glacial acetic acid as the acid constituent to affect syneresis of the gel according to the process of the present invention. In each experiment the glacial acetic acid was blended into the gel by hand stirring and the pH of acid treated gel determined. The acid treated gel was then allowed to stand under quiescent conditions for 30 minutes and then placed into a muslin cloth and squeezed by hand to remove free water. The sample was then weighed and compared to the weight of the original sample. The loss of the water represented the amount of entrained water removed from the gel by the addition of the glacial acetic acid. The results of such experiment are tabulated below:

TABLE 2

| Wt % Gel | Wt % Acid | pH of Gel after acid treatment | Wt % water removed |
|---|---|---|---|
| 99.5 | 0.5 | 5.4 | 10.30 |
| 99.0 | 1.0 | 5.1 | 31.24 |
| 98.0 | 2.0 | 4.6 | 42.60 |
| 97.0 | 3.0 | 4.3 | 45.44 |
| 96.0 | 4.0 | 4.2 | 41.18 |

EXAMPLE III

An aqueous emulsion containing the gel of the protein-aldehyde complex was formed by admixing 450 pounds water, 100 pounds soymeal, 75 pounds sunflower seed meal, and 5.5 pounds of caustic soda. As previously stated, the caustic soda was employed to provide an alkaline pH condition to facilitate solubilization of the protein on the soymeal and sunflower seed meal. The protein-water phase and 90 pounds of tallow were then combined in a colloid mill and emulsification completed by passage through a homogenizer. Once the desired emulsion had been formed 9 pounds of formalin, an aqueous mixture containing 37 percent formaldehyde was incorporated into the emulsion to form the desired protein-aldehyde complex. The gel formed was then separated and determined to have a pH of 10.9 and a moisture content of 68.4 weight percent. The gel was then contacted with varying amounts of sulfuric acid to determine the effect of the addition of sulfuric acid in the removal of entrained water from the gel. In each experiment the sulfuric acid was blended into the gel by hand stirring and the pH determined. The acid treated mix was then allowed to stand for 30 minutes, placed in a muslin cloth and hand squeezed to remove free water. The amount of water removed represented the amount of entrained water removed from the gel by the addition of the sulfuric acid. The results of these experiments are tabulated below:

TABLE 3

| Wt % Gel | Wt % Acid | pH of Gel after acid treatment | Wt % water removed |
|---|---|---|---|
| 99.5 | 0.5 | 4.3 | 16.08 |
| 99.0 | 1.0 | 2.9 | 41.66 |
| 98.5 | 1.5 | 1.8 | 46.78 |
| 98.0 | 2.0 | 1.3 | 46.00 |
| 97.0 | 3.0 | 0.9 | 42.39 |
| 96.0 | 4.0 | 0.9 | 42.39 |

EXAMPLE IV

A gel was prepared according to the procedures set forth in Example III and was determined to have a moisture content of 68.4 percent and a pH of 10.9. The gel was contacted with hydrochloric acid to determine the effect of hydrochloric acid on removing entrained water from the gel. In each experiment the hydrochloric acid was blended into the gel by hand stirring and the pH of the acid treated gel determined. The resulting mixture was then allowed to stand for 30 minutes and placed in a muslin cloth for removal of the free water by hand squeezing. The amount of water removed represented the entrained water removed by the treatment of the gel with hydrochloric acid. The results of such experiments are tabulated below in Table 4:

TABLE 4

| Wt % Gel | Wt % Acid | pH of Gel after acid treatment | Wt % water removed |
|---|---|---|---|
| 99.5 | 0.5 | 6.5 | trace |
| 99.0 | 1.0 | 4.9 | 5.48 |
| 98.5 | 1.5 | 4.5 | 25.58 |
| 98.0 | 2.0 | 4.3 | 35.81 |
| 97.0 | 3.0 | 2.9 | 48.24 |
| 96.0 | 4.0 | 1.7 | 52.63 |

The above data is believed to indicate that by subjecting the protein-aldehyde complex containing gel material to the acid treatment of the present invention, a tightening of the protein-aldehyde bond results which causes the exudation of water, a condition known as synereris. By this method and as shown in the examples, water can readily be removed from a gel. Further, it should be noted that the acid treated gel is a granular gel which does not have a tendency to agglomerate so that upon passing the acid treated gel into a drier a granular material is provided having an average diameter of about 5 to about 200 microns. Thus, a granular material can be provided from the gel without the increased steps of grinding and the like, and the efficiency of the drier can be greatly enhanced due to the reduced amount of moisture present in the gel.

While this invention has been explained in relation to its preferred embodiments, it is to be understood that various modifications thereof will now become apparent to those skilled in the art upon reading the specifications, and it is intended to cover such modifications as fall within the scope of the appended claims.

What is claimed is:

1. A process for producing lipid feed supplements for ruminant animals comprising:
    a. forming an aqueous emulsion by admixing in an aqueous solution having the pH of at least 7.0, a proteinaceous material and a lipid material wherein the lipid material and proteinaceous material are present in a weight ratio of from about 1:1 to about 6:1;
    b. contacting the emulsion with from about 0.5 to about 6 weight percent of an aldehyde, based upon the weight of the proteinaceous material, to encapsulate the lipid material within an aldehyde-protein complex, and allowing formation of a gel;
    c. contacting the gel with an effective amount of acid to provide a gel having a pH of less than 6.5 for a period of time effective to allow syneresis of the gel; and
    d. recovering a granular gel.

2. The process for producing lipid feed supplements of claim 1 wherein the aqueous emulsion is formed by admixing an effective amount of caustic material into water to form an aqueous solution having a pH of at least 7; admixing the proteinaceous material into the aqueous solution to form a resultant solution; heating the resulting solution to a temperature of from about 50° to about 80° C for a period of time effective to insure solubility of the proteinaceous material; and thereafter incorporating the lipid material into the resulting solution of form the aqueous emulsion.

3. The process for producing lipid feed supplements of claim 1 wherein the aqueous emulsion is maintained at a pH of at least 10.5 and thereafter the acid is employed in an amount effective to induce syneresis and provide a pH in the range of from about 1.7 to about 5.

4. The process for producing lipid feed supplements of claim 1 wherein the acid is employed in an amount from about 1 to about 4 weight percent and the acid is selected from the group consisting of phosphoric acid, sulfuric acid, hydrochloric acid and acetic acid.

5. The process for producing lipid feed supplements of claim 4 wherein the acid is present in the amount of about 1 to about 2 weight percent and the acid is phosphoric acid.

6. The process for producing lipid feed supplements of claim 1 wheren the caustic material is sodium hydroxide flake.

7. In a process for producing an aqueous gel of lipid feed supplements wherein an aqueous emulsion is formed by admixing in an aqueous solution having a pH of at least 7.0, a lipid material with a proteinaceous material to form the aqueous emulsion and thereafter contacting the emulsion with an effective amount of an aldehyde to encapsulate the lipid material within an aldehyde-protein complex and allowing formation of an aqueous gel, the improvement comprising contacting the aqueous gel with an acid to provide a gel having a pH of less than about 6.5 for an effective period of time to allow syneresis of the gel, and thereafter recovering a concentrated granular gel.

8. The process of claim 7 wherein the acid is incorporated in an amount sufficient to provide a gel having a pH in the range of from about 1.7 to 6.5 and the gel is allowed to remain, after incorporation of the acid, at ambient temperatures and under quiescent conditions for a period of time of from about 10 to about 30 minutes to effect syneresis of the gel.

9. The process of claim 7 wherein the acid is selected from the group consisting of phosphoric acid, sulfuric acid, hydrochloric, and acetic acid.

10. The process of claim 7 wherein the acid is employed in an amount of from about 1 to about 4 weight percent.

11. The process of claim 10 wherein the acid is phosphoric acid and is employed in an amount of from about 1 to about 2 weight percent.

12. The process of claim 7 which includes the step of drying the recovered concentrated gel to recover a granular free-flowing feed supplement.

13. The process of claim 12 wherein the drying step comprises heating the recovered granular gel at a temperature of from about ambient to about 200 degrees F for a period of time effective to provide a granular free-flowing product having a moisture content of less than about 14 weight percent.

14. An improved process for producing lipid feed supplements for ruminant animals which comprises the sequential steps of:
   a. forming an aqueous emulsion by admixing, in an aqueous solution having a pH of at least 7.0, a lipid material and a proteinaceous material wherein the lipid material and proteinaceous material are present in a weight ratio of from 1:1 to about 6:1;
   b. contacting the emulsion with from about 0.5 to about 6 weight percent of an aldehyde, based upon the weight of the proteinaceous material, to encapsulate the lipid material within an aldehyde-protein complex and allowing formation of a gel;
   c. contacting the gel with an effective amount of an acid to provide an acid treated gel having a pH of less than about 6.5 for a period of time to effect syneresis of the gel; and
   d. separating exudated water to recover a granular gel of a protein-aldehyde complex encapsulated lipid material.

15. The process for producing lipid feed supplements of claim 14 wherein the gel of the lipid encapsulated with a protein-aldehyde reaction product has a pH of at least 10.5 and the acid treated gel has a pH of from about 1.7 to about 5.

16. The process for producing lipid feed supplements of claim 14 wherein the acid is selected from the group of phosphoric acid, sulfuric acid, hydrochloric acid and acetic acid, and the acid is employed in an amount of from about 1 to about 4 weight percent.

17. The process for producing lipid feed supplements of claim 16 wherein the acid is phosphoric acid and is employed in an amount of from about 1 to 2 weight percent.

* * * * *

UNITED STATES PATENT AND TRADEMARK OFFICE
CERTIFICATE OF CORRECTION

PATENT NO. : 4,042,718

DATED : August 16, 1977

INVENTOR(S) : Robert M. Rawlings; Donald Procter

It is certified that error appears in the above-identified patent and that said Letters Patent are hereby corrected as shown below:

Col. 3, line 21, "effective of" should be --effective amount of--.

Col. 4, line 19, "liqid" should be --lipid--.

Col. 8, line 36 (Claim 6), "wheren" should be --wherein--.

Signed and Sealed this

Twentieth Day of December 1977

[SEAL]

Attest:

RUTH C. MASON
Attesting Officer

LUTRELLE F. PARKER
Acting Commissioner of Patents and Trademarks